United States Patent
Wang et al.

(10) Patent No.: US 7,801,431 B2
(45) Date of Patent: Sep. 21, 2010

(54) IMAGE CAPTURING DEVICE AND AUTO-FOCUS METHOD THEREOF

(75) Inventors: Wei-Jen Wang, Tu-Cheng (TW); Shih-Pao Cheng, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 266 days.

(21) Appl. No.: 12/166,338

(22) Filed: Jul. 2, 2008

(65) Prior Publication Data
US 2009/0245776 A1    Oct. 1, 2009

(30) Foreign Application Priority Data
Mar. 28, 2008    (CN) .......................... 2008 1 0300774

(51) Int. Cl.
G03B 17/00    (2006.01)
G06K 9/00     (2006.01)
H04N 5/76     (2006.01)
H04N 5/222    (2006.01)
G03B 13/00    (2006.01)
H04N 5/232    (2006.01)

(52) U.S. Cl. .......................... 396/79; 396/60; 382/118; 348/231.99; 348/333.01; 348/333.11; 348/333.12; 348/345

(58) Field of Classification Search .................... 396/79
See application file for complete search history.

(56) References Cited

U.S. PATENT DOCUMENTS

| 7,376,347 | B2 * | 5/2008 | Sugimoto | 396/60 |
| 2008/0002048 | A1 | 1/2008 | Ito et al. | 348/345 |
| 2009/0015703 | A1 * | 1/2009 | Kim et al. | 348/333.12 |
| 2009/0096913 | A1 * | 4/2009 | Wang et al. | 348/345 |

* cited by examiner

Primary Examiner—Melissa J Koval
(74) Attorney, Agent, or Firm—Zhigang Ma

(57) ABSTRACT

An image capturing device includes a lens unit, an image sensor, a face recognition unit, a selecting unit, an auto-focusing (AF) unit and a driving unit. The lens unit focuses images onto the image sensor. The image sensor converts the images into electronic signals. The face recognition unit locates any faces in a current image. If faces are detected, the selecting unit indicates to a user where the faces are located in the image, and selects one of the locations as a main focus area in response to a user input. The driving unit is configured for moving the lens unit. The AF unit controls the driving unit to focus the lens unit according to the selected location.

11 Claims, 3 Drawing Sheets

```
framing all of faces in a photographing image
```
↓
```
selecting one face as focus areas, and
setting focus powers for the focus areas
and non-focus areas of the photographing
areas
```
↓
```
storing the focus areas and focus powers
corresponding to the focus areas and focus
powers corresponding to the non-focus
areas
```
↓
```
performing an auto-focus process using a
base evaluation value of an image of the
photographing area, wherein the base
evaluation value is calculated by taking the
total of multiplying a base evaluation value
of each focus area and non-focus area by
the focus power corresponding to the focus
areas and non-focus area
```
↓
```
moving a lens unit of the image capturing
device to an in-focus position.
```

FIG. 3

IMAGE CAPTURING DEVICE AND AUTO-FOCUS METHOD THEREOF

BACKGROUND

1. Technical Field

The present invention relates to image capturing devices, and particularly, to an image capturing device and an auto-focus method thereof.

2. Description of the Related Art

Image capturing devices, such as those used in digital cameras and mobile phones, have an auto-focus (AF) feature. An AF method using face recognition technology is a relatively new technology. This AF method enables image capturing devices to automatically detect where a face of a person is located in a captured image, and adjust the lens to focus on that face accordingly. However, if more than one face is in view, the AF method may not be smart enough to judge which face in the image should be used for focusing.

What is needed, therefore, is an image capturing device that can overcome the above-described problem.

SUMMARY

In a present embodiment, an image capturing device includes a lens unit, an image sensor, a face recognition unit, a selecting unit, an auto-focusing (AF) unit and a driving unit. The lens unit forms images onto the image sensor. The image sensor converts the images into electronic signals. The face recognition unit locates any faces in a current image. If faces are detected, the selecting unit indicates to a user where the faces are located in the image, and selects one of the locations as a main focus area in response to a user input. The driving unit is configured for moving the lens unit. The AF unit controls the driving unit to focus the lens unit according to the selected location.

BRIEF DESCRIPTION OF THE DRAWINGS

Many aspects of the present image capturing device and auto-focus method can be better understood with reference to the accompanying drawings. The components in the drawings are not necessarily drawn to scale, the emphasis instead being placed upon clearly illustrating the principles of the present image capturing device and the auto-focus method. Moreover, in the drawings, like reference numerals designate corresponding parts throughout the several views.

FIG. 3 is a flowchart of an auto-focus method for an image capturing device according to a present embodiment.

DETAILED DESCRIPTION

Embodiments of the present image capturing device and auto-focus method will be now described in detail with reference to the drawings. In the following described embodiments, the image capturing device can be but is not limited to a digital still camera, a digital video camera, or any other electronic device equipped with a camera module.

Figure 1:
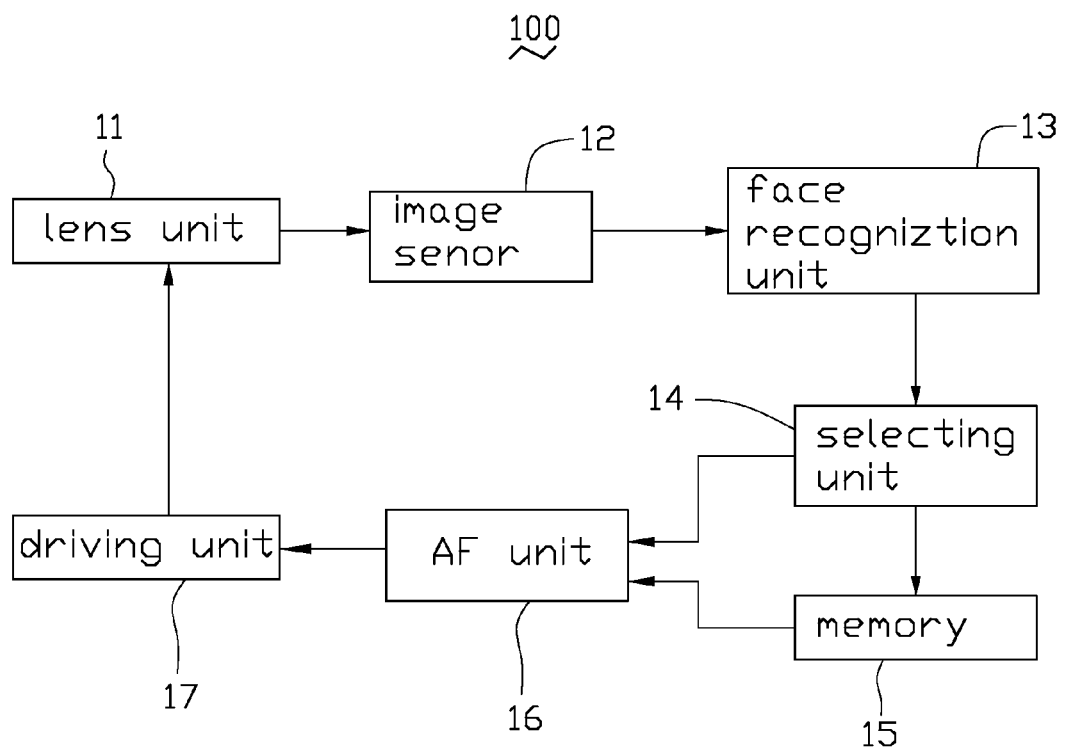
FIG. 1 is a function block diagram of the hardware structure of an image capturing device in accordance with a present embodiment.

Referring to FIG. 1, an image capturing device 100, according to an embodiment, includes a lens unit 11, an image sensor 12, a face recognition unit 13, a selecting unit 14, a memory 15, an auto-focusing (AF) unit 16, and a driving unit 17. The lens unit 11 focuses optical images on the image sensor 12. The image sensor 12 converts the optical images into electronic signals. During AF, an initial image is captured and is examined by the face recognition unit 13, which locates any faces in the image. The selecting unit 14 displays the locations on a display of the image capturing device 100, and selects one of the locations as a main focus area in response to a user input. Then, a number of images are captured in quick succession, one for each of a plurality of pre-determined focus positions of the lens unit 11 as set by the driving unit 17 under control of the AF unit 16.

The lens unit 11 may include one or many lenses. The lens unit 11 can be, for example a zoom lens, a macro lens etc.

The image sensor 12 can be a charge coupled device (CCD) image sensor or a complementary metal oxide semiconductor (CMOS) image sensor. Ceramic leaded chip carrier (CLCC) package, a plastic leaded chip carrier (PLCC), or a chip scale package (CSP) may be used for packaging the image sensor 12.

In this embodiment the face recognition unit 13 is configured for locating any faces in the initial image then causing those faces to be framed in the image when it is displayed. The face recognition unit 13 may be realized by any existing face recognition method.

The selecting unit 14 is configured for displaying the locations on a display of the image capturing device 100, and selecting one of the locations as a main focus area in response to a user input. The selecting unit 14 shows the image with framed locations of face thereon and sets focus power for determining which location(s) need to be given greater priority in response to a user input. In this embodiment, the selecting unit 14 is a LCD touch screen. For example, if a framed location is touched, the focus power of this touched location is higher than those of other portions. In addition, the selecting unit 14 can also be used as a viewfinder of the image capturing device 100.

Figure 2:
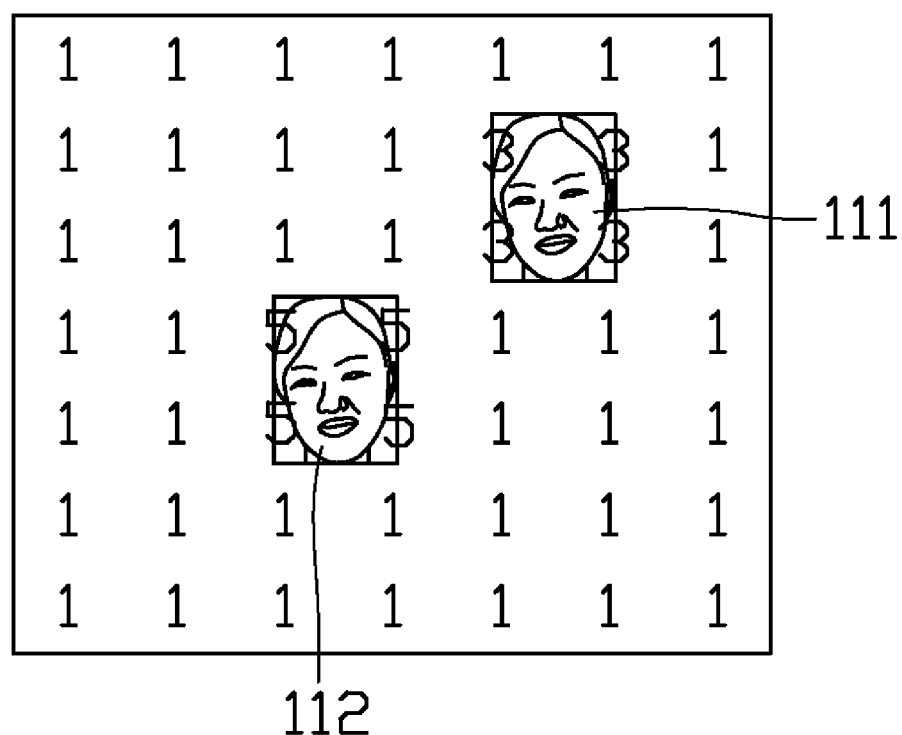
FIG. 2 is a schematic view showing focus areas of an image displayed by the image capturing device of FIG. 1.

Users can also set focus powers of framed locations as primary focus area and subordinate focus areas. For example, the users can touch several framed locations, and the degrees of emphasis can be determined under the control of the duration of touch on the corresponding framed locations. Referring to FIG. 2, this shows an image of two persons: a first person 111 and a second person 112. A user may want to give emphasis to the area of the second person 112 as a primary photo object, and the first person 111 as a subordinate photo object. In order to do this, the selecting unit 14 is used to set focus powers for the portion of the first person 111 and the portion of the second person 112. A focus power for the non-focus areas of the current image besides the selected focus areas can also be set. In the illustrated example, the value of the focus power for the face of the second person 112 is set as 5, assuming the values of focus power range from 0 to 5. The value of the focus power of the face of the first person 111 is set as 3, and the value of the focus power of the non-emphasized areas is set as 1. It is to be understood that the focus power of the non-emphasized areas of the current image can instead be set at predetermined default value, such as 0.

The image capturing device 100 further comprises a memory 15 configured for storing the area of the image containing the highlighted face (main focus area) selected by the selecting unit 14 according to the user's input, and focus powers corresponding to the highlighted face and focus powers corresponding to other areas besides the highlighted face.

The AF unit 16 can focus the lens unit 11 with emphasis on any portion of the image. In this embodiment, the AF unit 16 receives the focus powers and thereby focuses on locations accordingly. In detail, various methods, such as a contrast measurement method, can be used by the unit.

The AF unit 16 can receive information regarding the selected main focus area and the non-emphasized focus areas and corresponding focus powers of the main focus area and the non-focus areas from the memory 15. The AF unit 16 calculates a base evaluation value of an image of the current image. This is obtained by taking the total of multiplying a base evaluation value of each main focus area and non-focus area by the focus power corresponding to the area. Then the AF unit 16 gets a maximal evaluation value of these photographing images and the position of the lens unit 11 corresponding to the maximal evaluation value named as in-focus position (main focus position). The base evaluation value of each area can be contrast, grayscale, or intensity of the area. The AF unit 16 can control the auto-focus operation of the image capturing device 100 to detect an in-focus position of the lens unit 11 basing upon the base evaluation value. The method of detecting the in-focus position of the lens unit 11 can be any of various kinds of known methods, such as a hill-climbing method. The AF unit 16 controls the driving unit 17 to move the lens unit 11 to the in-focus position based upon the position of the lens unit 11 corresponding to the maximal evaluation value.

The driving unit 17 is configured for moving the lens unit 11 back and forth under control of the AF unit 16. The driving unit 17 moves the lens unit 11 during the process of detecting the in-focus position of the lens unit 11, and moves the lens unit 11 to the in-focus position once the in-focus position of the lens unit 11 has been detected.

Referring to FIG. 3, a flowchart of an auto-focus method for the image capturing device 100 is shown. The method includes the steps of: framing faces in a current image; selecting one face as main focus area, and setting focus powers for the main focus area and non-focus areas of the current images; storing the focus areas and focus powers corresponding to the focus area and focus powers corresponding to the non-focus areas; performing an auto-focus process using a base evaluation value of an image of the current image, wherein the base evaluation value is calculated by taking the total of multiplying a base evaluation value of each focus area and non-focus areas by the focus power corresponding to the focus areas and non-focus area; and moving a lens unit 11 of the image capturing device 100 to an in-focus position.

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. An image capturing device comprising:
   an image sensor;
   a lens unit configured for focusing images onto an image sensor;
   a face recognition unit configured for detecting a number of locations where the faces of the persons are located in a current image;
   a selecting unit configured for displaying where the faces are located in the image and selecting one of the locations as a main focus area in response to a user input;
   a driving unit configured for moving the lens unit; and
   an AF unit configured for calculating a in-focus position and controlling the driving unit to focus the lens unit according to the in-focus position.

2. The image capturing device as claimed in claim 1, wherein the selecting unit comprises a touch screen which is used for selecting a location as main focus area on the touch screen.

3. The image capturing device as claimed in claim 1, wherein the image capturing device is a device selected from the group consisting of a digital camera, a video camera and a mobile phone.

4. The image capturing device as claimed in claim 1, wherein the image sensor is a charge-coupled device or a complementary metal oxide semiconductor device.

5. The image capturing device as claimed in claim 1, wherein the image sensor is one selected from the group consisting of a ceramic leaded chip carrier package type image sensor, a plastic leaded chip carrier package type image sensor and a chip scale package type image sensor.

6. An image capturing device comprising:
   an image sensor;
   a lens unit configured for focusing images onto an image sensor;
   a face recognition unit configured for detecting a number of locations where the faces of the persons are located in a current image;
   a selecting unit configured for displaying where the faces are located in the image and selecting one of the locations as a main focus area in response to a user input;
   a memory configured for storing the main focus area selected by the selecting unit and focus powers corresponding to the main focus area, and focus powers corresponding to other areas besides the main focus area of the current image;
   a driving unit configured for moving the lens unit; and
   an AF unit is configured for calculating a in-focus position and controlling the driving unit to focus the lens unit according to the in-focus position.

7. The image capturing device as claimed in claim 6, wherein the image capturing device is a device selected from the group consisting of a digital camera, a video camera and a mobile phone.

8. The image capturing device as claimed in claim 6, wherein the image sensor is a charge-coupled device or a complementary metal oxide semiconductor device.

9. The image capturing device as claimed in claim 6, wherein the image sensor is one selected from the group consisting of a ceramic leaded chip carrier package type image sensor, a plastic leaded chip carrier package type image sensor and a chip scale package type image sensor.

10. The image capturing device as claimed in claim 6, wherein the focus power of the areas of the image besides the main focus area is a predetermined default value.

11. The image capturing device as claimed in claim 10, wherein the predetermined default value is 0.

* * * * *